Oct. 13, 1964     W. E. N. DOTY     3,152,658

METHOD OF GENERATING SEISMIC PATTERNS

Filed June 1, 1959

INVENTOR.
WILLIAM E. N. DOTY
BY Floyd Trimble
ATTORNEY

United States Patent Office 3,152,658
Patented Oct. 13, 1964

3,152,658
METHOD OF GENERATING SEISMIC PATTERNS
William E. N. Doty, Ponca City, Okla., assignor to Continental Oil Company, Ponca City, Okla., a corporation of Delaware
Filed June 1, 1959, Ser. No. 817,133
3 Claims. (Cl. 181—.5)

This invention relates generally to improvements in the art of reflection type seismic prospecting, and more particularly, to an improved method of seismic prospecting utilizing a plurality of seismic signal transmitting stations, that is, an improved method of seismic prospecting wherein the seismic signals are generated in a pattern. Application U.S. Ser. No. 789,975, filed January 29, 1959, entitled "Composition Sequentially Produced Signals" by William E. N. Doty is related to this specification.

As it is well known in the art of reflection type seismic prospecting, a seismic disturbance created at or near the surface of the earth generates various types of seismic waves, i.e., various components of the initial seismic wave, which follow different paths before reaching spaced detecting stations. Since the purpose of the reflection method is to determine the depth of geological reflectors and discover their structural features, only reflection paths are of interest and convey the desired information. The other paths create a perturbing effect which is commonly designated interference or noise. Examples of the undesired paths are surface, refraction, diffraction and scatter. However, the vertical or substantially vertical reflections reach spaced detectors substantially simultaneously; whereas, the interference or noise reaches the detectors at varying times. In other words, while the interferences and noises have substantial or random phase differences between spaced detector locations, the reflected waves are substantially in phase at all the receiving points.

Perhaps the most popular procedure for minimizing the effect of interference and noise is by what is commonly known in the art as pattern shooting. Several charges of dynamite are arranged in a geometrical array and detonated simultaneously. A portion of the seismic energy traveling along the undesired paths mentioned above will be cancelled out by the geometrical arrangement of the shot points, such that the seismic energy traveling along the reflection paths from the various shot points will be magnified or intensified with respect to the energy traveling the undesired paths. Detectors may be arranged with respect to the shot points in such a manner as to receive a larger portion of the seismic energy following the reflection paths, such that the reflection events will be more apparent on the resulting records, and a substantial improvement in the location of the geological reflectors is obtained when compared with the use of a single seismic energy source.

Another method of minimizing the effect of interference and noise is by what is commonly known in the art as a compositing procedure. Several different seismic disturbances are sequentially created at spaced transmitting stations and the resulting seismic waves are detected by a plurality of detectors, with the detectors being located in the same positions during the creation of each seismic disturbance of the series. The seismic energy received at each detector location is usually recorded on a magnetic recording medium, such that a recorded trace or track is provided for each detector location corresponding to each seismic disturbance of the series. The tracks corresponding to each detector location are then simultaneously, but individually, reproduced to provide a plurality of individual electrical signals corresponding to the individual seismic signals received at the respective location. These individual electrical signals are then combined in a relatively complicated mixing circuit to provide a composite signal for each detector location. It will be apparent to those skilled in the art that when a set of the individual signals are composited in a mixing circuit, the random interference and noise will be reduced to provide a resulting signal from which reflections may be located.

As previously indicated the seismic energy source presently in most wide spread use is dynamite. Obviously, a large group of charges of dynamite may be detonated simultaneously to generate seismic waves in the earth at a plurality of transmitting stations, such that the seismic waves traveling the unwanted paths will be correctly timed for cancellation. However, it is virtually impossible to transmit the same amount of seismic energy from each of the shot points, principally due to the fact that only a minor portion of the energy created by each charge of dynamite is transmitted into the earth, and the structure of the earth at each of the shot points will be somewhat different. As a result, neither the pattern shooting method nor the compositing method will eliminate a large proportion of the seismic energy traveling the undesired paths when dynamite is used as the energy source. It may also be noted that various workers in the art have proposed the use of a dropping weight for the creation of seismic energy in the earth at a plurality of transmitting stations for either a pattern method or a compositing method. However, when weights are used, the precise time that each weight will contact the earth and generate seismic energy is extremely difficult to control, such that the energy traveling the undesirable paths is not effectively cancelled.

The present invention contemplates a novel method of seismic prospecting wherein equal and precise amounts of seismic energy are simultaneously transmitted into the earth at a plurality of first transmitting station locations and the energy received at suitable detectors is recorded. Subsequently, identical amounts of seismic energy are simultaneously transmitted into the earth at a second plurality of spaced transmitting station locations and the resulting seismic energy received at the detectors is also recorded. Since the precise timing of the transmissions is controlled, and an equal amount of seismic energy is transmitted into the earth at each of the transmitting stations, a portion of the energy traveling along the undesired paths is cancelled when each group of the transmissions are sent, and an additional portion of the seismic energy traveling along the undesired paths may be easily eliminated by compositing the resulting records, such that a final record may be provided which clearly indicates the reflection events. Mechanical vibrators capable of operating in response to a control or synchronizing signal are used to transmit the seismic energy into the earth, such that both the timing and the amount of the seismic energy may be accurately controlled. As a result, a relatively small number of vibrators may be used to transmit an exceedingly large number of seismic signals into the earth at different locations to effectively minimize the unwanted interference and noise.

Broadly stated, the present invention may be defined as:

(a) Simultaneously transmitting identical seismic signals into the earth at each of a first group of spaced transmitting stations, (b) Simultaneously receiving the various components of all the signals transmitted at the first group of transmitting stations at a detecting station located remote from the first group of transmitting stations, (c) Recording the signal received at the detecting station on a recording medium as an elongated track, then (d) Simultaneously transmitting identical seismic signals into the earth at each of a second group of spaced transmitting stations which are spaced from the first group of transmitting stations and from the detecting station, the seismic signals transmitted at the second group of transmitting stations being identical with the seismic signals transmitted from the first group of transmitting stations, (e) Simultaneously receiving the various components of all the seismic signals transmitted at the second group of transmitting stations at said detecting station, (f) Recording the second signal received at the detecting station on said recording medium as an elongated track in parallel and side-by-side relation with the first-mentioned track, then (g) Reproducing and compositing the signals represented by said tracks to provide a composite signal equivalent to a signal which would be received at the detecting station upon transmission of said identical signals simultaneously at all of the transmitting stations.

An important object of this invention is to provide an efficient method of reflection type seismic prospecting which requires a minimum of time to perform and wherein the final record may be easily produced in the field, such that the results obtained in a specific area may be immediately evaluated.

Another object of this invention is to minimize the seismic energy traveling along undesired paths in a reflection type seismic prospecting method.

A further object of this invention is to minimize the complexity and cost of the equipment required in a pattern type of seismic prospecting method.

Another object of this invention is to minimize the damage in seismic prospecting and yet provide resulting records which may be easily interpreted.

A still further object of this invention is to utilize a relatively small number of mechanical vibrators for transmitting seismic energy into the earth at a large number of transmitting stations and obtain the maximum directivity of the reflection type seismic energy.

Other objects and advantages of the invention will be evident from the following detailed description, when read in conjunction with the accompanying drawings which illustrate my invention.

Figure 1:
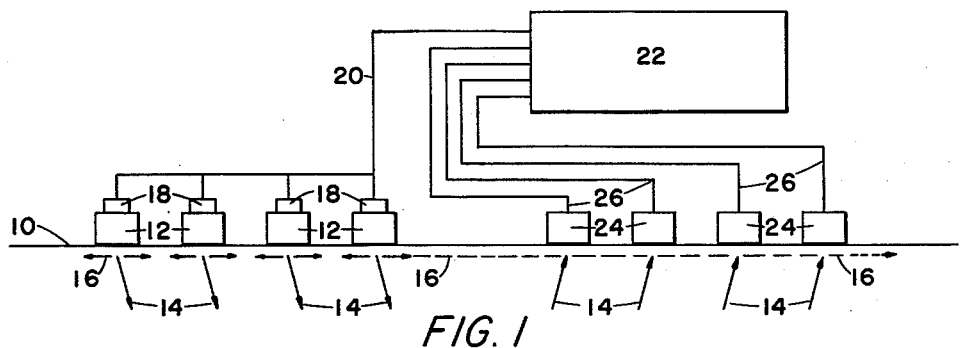
FIGURE 1 is a diagrammatic illustration of a portion of a field procedure utilizing the present invention.

Referring to the drawings in detail, and particularly FIG. 1, reference character 10 designates the surface of the earth on which is positioned a plurality of vibrators 12, such as mechanical vibrators, arranged in any desired pattern, as will be more fully hereinafter set forth. Each vibrator 12 creates seismic energy in the earth which travels along various paths through the earth. For example, a portion of the seismic energy will travel generally downward as indicated by the arrows 14 for reflection by various types of geological reflectors as is well known in the art. Other portions of the seismic energy created by the vibrators 12 will travel along undesired paths, such as indicated by the arrows 16 which illustrate surface waves traveling along the surface 10 of the earth.

Each vibrator 12 is provided with a suitable controller 18 capable of operating the respective vibrator in accordance with a control signal fed to the respective controller. For example, and as a preferred embodiment of the present invention, each controller 18 will energize the respective vibrator 12 for generating a pulse type signal into the earth when a pulse type signal is fed to the respective controller, with the output of the respective vibrator being identical with the control signal fed to the respective controller. These control signals are simultaneously fed to the various controllers 18 through a conductor 20 leading from a combination recorder and reproducer 22 which will be more fully hereinafter described. Any desired controller 18 may be used, such as a controller of the type disclosed in U.S. Patent 2,844,777.

A plurality of detectors 24 are positioned on the surface 10 of the earth in spaced relation with respect to one another and in spaced relation with respect to the vibrators 12. As indicated by the arrows 14 and 16, each of the detectors 24 will receive seismic waves which have followed various paths from the vibrators 12. The detectors 24 operate in the usual fashion to convert seismic signals to electrical signals. The respective electrical signals provided by each detector are fed through its respective conductor 26 to the combination record and reproduce apparatus 22. It may also be noted that each of the detectors 24 may actually be either a single detector at each of the detecting locations or stations indicated in FIG. 1, or a nest of detectors at each of these stations. In the event several nests of detectors are used, all of the signals provided by the detectors from each nest are normally combined in a common conductor 26 and fed to the record and reproduce apparatus 22. Furthermore, it will be understood that any desired number of detectors 24 may be used, although I have indicated only four such detectors in FIG. 1.

Figure 2:
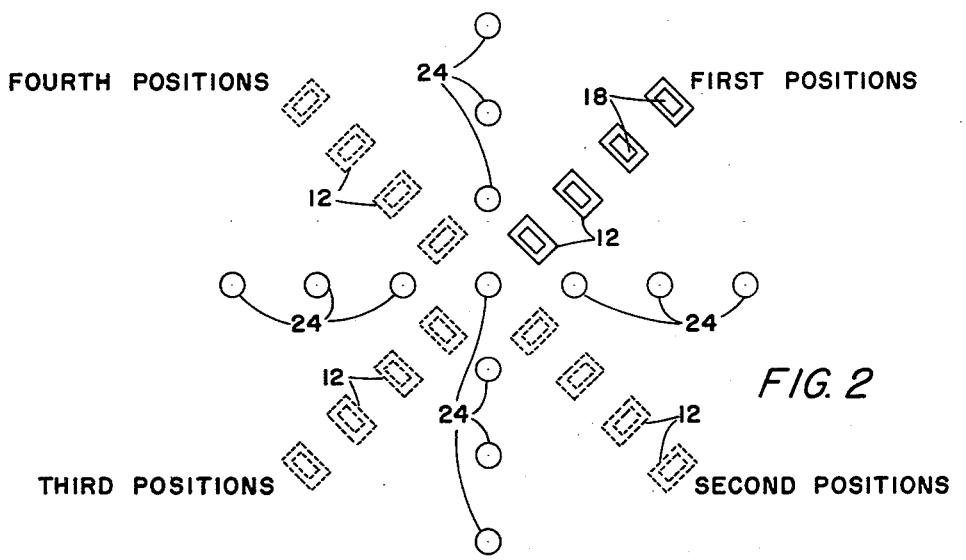
FIGURE 2 is a schematic plan view of a typical seismic pattern which may be utilized in the present method.

A typical pattern for the vibrators 12 and detectors 24 in a practice of the present invention is illustrated in FIG. 2. The detectors 24 are arranged in the form of a cross over the area to be surveyed, and the vibrators 12 are first positioned as illustrated in the full lines in FIG. 2 along a line about half way between two of the rows of detectors 24. A control signal previously recorded in the record and reproduce apparatus 22 is then simultaneously fed to each of the controllers 18 of each of the vibrators 12, and the vibrators simultaneously transmit seismic energy into the earth. Each of the detectors 24 will receive the resulting seismic energy after travel along various paths through the earth, including both reflection paths as illustrated by the arrows 14 in FIG. 1 and along undesired paths as indicated by the arrows 16 in FIG. 1. However, by the simultaneous transmission of identical amounts of seismic energy, a portion of the seismic energy traveling along undesired paths will be cancelled out prior to reaching any of the detectors 24, and the detectors 24 will principally receive reflection type energy. The signal received by each detector 24 is individually recorded by the apparatus 22.

The vibrators 12 are then moved as a group to the dotted line positions designated "second positions" in FIG. 2. The vibrators 12 are then again simultaneously operated in response to the control signal fed to the respective controllers 18, to again simultaneously transmit the same amount of seismic energy into the earth. The detectors 24 will again receive principally reflection type energy and the resulting signal provided by each of the detectors 24 is fed to the record and reproduce apparatus 22 for recording. It will be understood that each signal provided by each of the detectors 24 will be recorded separately by the record and reproduce apparatus 22, and that the time relationship between transmission of the seismic signals by the vibrators 12 and reception of these signals by the detectors 24 will be preserved in the records made in the apparatus 22.

The vibrators 12 are sequentially moved as a group to the positions marked "third positions" and "fourth positions" illustrated in FIG. 2, such that seismic energy will be transmitted into the earth at a large number of transmitting stations in the area under investigation, and the seismic energy received by each of the detectors 24 is individually recorded in the apparatus 22 in the same manner as for the first and second positions of the vibrators 12.

The various signals recorded by the apparatus 22 in response to operation of the detectors 24 are subsequently reproduced, composited, and re-recorded in another recorder (not shown) to provide the final record. In other words, the signals received by each detector 24 resulting from the sequential operation of the vibrators 12 in the first through the fourth positions illustrated in FIG. 2 are combined into a single signal. Since the time relation between the transmission by the vibrators 12 and the reception of the signals by the respective detector 24 at each of the vibrator locations is preserved in the record made by the apparatus 22, the time phase relations of the signals provided by each detector 24 are uniform. As a result, when all of these individual signals are combined, the in-phase portions of the signals representing seismic energy traveling along reflection paths will be intensified, and those portions of the signals representing seismic energy traveling along the undesired paths will be out-of-phase and will be substantially cancelled when the individual signals are composited. Cancellation of the portions of the individual signals representing seismic energy traveling along undesired paths is substantially magnified by the uniformity in amplitude of the individual transmissions. As a result, the composite signal produced by the individual signals from each detector 24 will clearly indicate the travel times of the seismic energy which is transmitted substantially vertically through the earth and is reflected to the respective detector by the subsurface geological reflectors. It will also be apparent to those skilled in the art that the various composite signals provided by combining all of the individual signals produced by each detector 24 may be further combined, filtered, etc. in various ways to further improve the final records.

In a preferred embodiment of this invention, the combination record and reproduce apparatus 22 comprises a suitable frame 30 having a magnetic drum 32 rotatably supported therein by a shaft 34 supported at opposite ends of the frame by suitable bearings 36. The drum 32 may be of any desired construction, such as being formed with a layer of magnetic material around its outer periphery, or being provided with a separate magnetic recording material (not shown) secured around its outer periphery. The drum 32 is rotated by a suitable motor 38 connected to the shaft 34 through a gear system 40, such that the drum 32 may be rotated at the desired speed. A stationary recording head 42 is mounted in the frame 30 near one end of the drum 32, and a plurality of narrow movable recording heads 44 are mounted on a block 46 on the same side of the drum 32 as the stationary head 42. The block 46 is threaded onto a control shaft 48 suitably mounted by bearings 50 in the opposite ends of the frame 30, and a support rod 52 extends through one side of the block 46 to prevent a turning movement of the block. One end of the control shaft 48 extends through the respective end of the frame 30 and is provided with a suitable hand knob 54 for selectively turning the shaft 48. It will be apparent that the block 46 will move lengthwise in the frame 30 upon a turning movement of the knob 54 for positioning the recording heads 44 with respect to the drum 32.

A stationary reproducing head 56 is mounted in the frame 38 in alignment with the stationary recording head 42, and a group of wide stationary reproducing heads 58 are mounted in the frame 30 opposite the block 46. It will also be noted that an equal number of movable recording heads 44 and stationary reproduce heads 58 are provided, and that each of the movable recording heads 44 is substantially narrower than the mating reproducing head 58.

Figure 3:
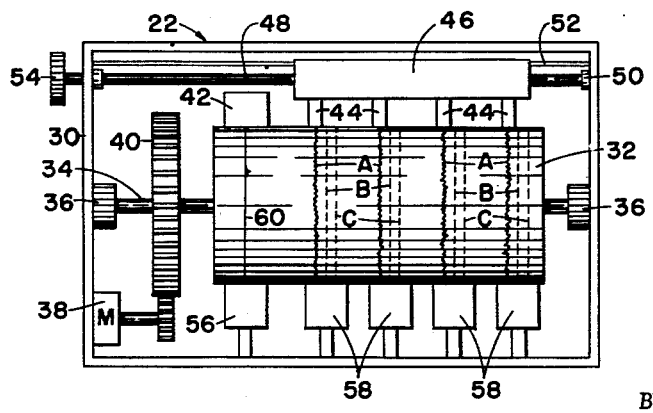
FIGURE 3 is a schematic plan view of a preferred combination recorder and reproducer used in the present method.

In use of the apparatus shown in FIG. 3, the reproduce head 56 is connected to the conductor 20 leading to the controllers 18 of the vibrators 12, and each detector 24 is connected to one of the movable recording heads 44. It will be understood that the record and reproduce apparatus 22 will be of sufficient size and will contain a recording head 44 for each of the detectors 24 used in the system. The desired control signal is first recorded on the drum 32 by the stationary recording head 42 as a trace or track 60 for controlling operation of the vibrators 12. As previously indicated, the control track 60 preferably represents a pulse type signal and this signal is preferably recorded on the drum 32 such that a pulse type signal will be reproduced by the head 56 and fed to the controllers 18 upon each revolution of the drum 32. Also, before the initial operation of vibrators 12, the block 46 is moved by the control shaft 48 until each recording head 44 is positioned opposite one edge of the mating reproducing head 58. In the embodiment shown in FIG. 3, the block 46 is moved along the shaft 48 toward the stationary recording head 42 as far as possible and yet provide that a signal recorded by each movable recording head 44 will be reproduced by the respective reproducing head 58. However, the heads 58 are disconnected during the recording of signals by the heads 44.

With the vibrators 12 positioned as illustrated in full lines in FIG. 2, in the positions designated "first positions," the motor 38 is operated to turn the drum 32 one revolution. The track 60 is so arranged on the drum 32 that the pulse type control signal will be reproduced by the head 56 during the initial portion of the movement of the drum 32 and fed to the controllers 18 for simultaneous operation of the vibrators 12. The resulting seismic energy received at each detector 24 is fed to the respective recording head 44 to provide a track designated by $a$ on the recording drum 32. Thus, each signal received by each detector 24 is recorded on the drum 32 as an elongated track extending circumferentially around the drum.

The vibrators 12 are then moved as a group to the positions designated by "second positions" in FIG. 2 and the drum 32 is again turned one revolution. The control signal represented by track 60 will again be simultaneously fed to the controllers 18 for simultaneous operation of the vibrators 12. However, before turning of the drum 32, the knob 54 is turned to index the movable heads 44 along the length of the drum 32 a very short distance. As a result, the signal received by each detector 24 is recorded by the respective head 44 as an elongated track $b$ in parallel and side-by-side relation with the corresponding track $a$ opposite the respective reproducing head 58.

The vibrators 12 are then moved to the "third positions" illustrated in FIG. 2 and the movable heads 44 are again indexed a short distance along the recording drum 32. Upon another rotation of the drum 32, the control signal will again simultaneously operate the vibrators 12 and the seismic energy received by each detector 24 will be recorded by the respective head 44 as a track $c$ parallel with and adjacent to the previous track $b$. This operation is repeated for the remaining positions of the vibrators 12 to provide a series of parallel tracks on the drum 32 opposite each of the reproducing heads 58, with each track representing one signal received by one of the detectors 24.

The various signals produced by the detectors 24 are then reproduced by energizing the heads 58 and again turning the drum 32. As previously indicated, each reproduced head 58 is substantially wider than the mating recording head 44 and is of a size to simultaneously scan all of the tracks recorded on the drum 32 by the respective recording head 44. As a result, each reproduce head 58 will automatically combine all of the individual signals recorded by the mating head 44 and produce a composite signal having an instantaneous amplitude equal to the algebraic addition of the instantaneous amplitudes of all the signals represented by the respective tracks being scanned. It may also be noted that each of the tracks $a$, $b$ and $c$ is recorded on the drum 32 in precise time relationship with respect to the generation of the control 60, such that the time phase relation of the various signals received by each detector 24 will be preserved in the tracks on the drum 32. As a result, the in-phase portions of the signals represented by the tracks *a*, *b* and *c* opposite each reproduce head 58 will be intensified or magnified in the composite signal, and the out-of-phase portions of these signals will tend to be cancelled. Furthermore, since an equal amount of energy is transmitted into the earth at each of the vibrator locations, the out-of-phase components of the received signals will have substantially the same amplitude and the maximum cancellation effect will be achieved. It will be apparent to those skilled in the art that the composite signals provided by the reproduce heads 58 may be easily recorded on a common recording medium along with the control signal reproduced by the head 56 to provide a common record from which the reflection events may be easily determined.

From the foregoing it will be apparent that the present invention provides a novel method of reflection type seismic prospecting which will require a minimum of field time to perform and will provide a record in the field which may be used to quickly evaluate the success of the operation. The present invention requires the use of a small number of vibrators capable of transmitting identical amounts of seismic energy into the earth simultaneously in response to a control signal, and these vibrators may be used as a group in various sequential operations to provide a pattern type of prospecting method having a large number of transmission locations. Since both the time of the transmissions and the amounts of energy are precisely controlled, the seismic energy traveling along unwanted paths may be effectively minimized. It will also be apparent that the present method will not cause damage in the area being investigated.

Changes may be made in the combination and arrangement of steps and procedures as heretofore set forth in the specification and shown in the drawings, it being understood that changes may be made in the embodiments disclosed without departing from the spirit and scope of the invention as defined in the following claims.

I claim:
1. In a method of seismic prospecting, the steps of:
   (*a*) simultaneously transmitting substantially identical seismic signals into the earth at each of a first group of spaced transmitting stations, each of said seismic signals so transmitted being substantially identical in frequency sweep, in rate of change of frequency versus time and in amplitude,
   (*b*) receiving substantially simultaneously the various components of all the signals transmitted at the first group of transmitting stations at a detecting station located remote from the first group of transmitting stations,
   (*c*) recording the signal received at the detecting station on a recording medium as an elongated track, then
   (*d*) simultaneously transmitting substantially identical seismic signals into the earth at each of a second group of spaced transmitting stations which are spaced from the first group of transmitting stations and from the detecting station, the seismic signals transmitted at the second group of transmitting stations being identical with the seismic signals transmitted from the first group of transmitting stations,
   (*e*) receiving substantially simultaneously the various components of all the seismic signals transmitted at the second group of transmitting stations at said detecting station,
   (*f*) recording the second signal received at the detecting station on said recording medium as an elongated track in parallel and side-by-side relation with the first-mentioned track with each received signal being recorded the same length of time after the respective signal transmission, then
   (*g*) reproducing and compositing the signals represented by said tracks to provide a composite signal equivalent to a signal which would be received at the detecting station upon transmission of said identical signals simultaneously at all of the transmitting stations.

2. A method as defined in claim 1 wherein said substantially identical signals are pulse type signals.

3. In a method of seismic prospecting, the steps of:
   (*a*) simultaneously transmitting substantially identical seismic signals into the earth at each of a first group of spaced transmitting stations, each of said seismic signals so transmitted being substantially identical in frequency sweep, in rate of change of frequency versus time, and in amplitude,
   (*b*) receiving substantially simultaneously the various components of all the signals transmitted at the first group of transmitting stations at a detecting station located remote from the first group of transmitting stations,
   (*c*) recording the signal received at the detecting station on a recording medium as an elongated track, then
   (*d*) moving said vibrators for a second group of spaced transmitting stations,
   (*e*) repeating steps (*a*), (*b*), (*c*) and (*d*) a plurality of times with each received signal being recorded the same length of time after the respective signal transmission,
   (*f*) reproducing and compositing the signals represented by said tracks to provide a composite signal equivalent to a signal which would be received at the detecting station upon transmission of said identical signals simultaneously at all of the transmitting stations.

References Cited in the file of this patent

UNITED STATES PATENTS

| | | |
|---|---|---|
| 2,427,421 | Rieber | Sept. 16, 1947 |
| 2,688,124 | Doty et al. | Aug. 31, 1954 |
| 2,690,532 | Johnson | Sept. 28, 1954 |
| 2,707,524 | Montgomery | May 3, 1955 |
| 2,732,906 | Mayne | Jan. 31, 1956 |
| 2,745,507 | Bodine | May 15, 1956 |
| 2,767,389 | McCollum | Oct. 16, 1956 |
| 2,851,121 | McCollum | Sept. 9, 1958 |
| 2,879,860 | Tilley | Mar. 31, 1959 |
| 2,888,663 | Blake et al. | May 26, 1959 |

UNITED STATES PATENT OFFICE
CERTIFICATE OF CORRECTION

Patent No. 3,152,658                                October 13, 1964

William E. N. Doty

It is hereby certified that error appears in the above numbered patent requiring correction and that the said Letters Patent should read as corrected below.

Column 6, line 73, after "control" insert -- signal --.

Signed and sealed this 3rd day of August 1965.

(SEAL)
Attest:

ERNEST W. SWIDER                              EDWARD J. BRENNER
Attesting Officer                                    Commissioner of Patents

UNITED STATES PATENT OFFICE
CERTIFICATE OF CORRECTION

Patent No. 3,152,658                  October 13, 1964

William E. N. Doty

It is hereby certified that error appears in the above numbered patent requiring correction and that the said Letters Patent should read as corrected below.

Column 6, line 73, after "control" insert -- signal --.

Signed and sealed this 3rd day of August 1965.

SEAL)
Attest:

ERNEST W. SWIDER                  EDWARD J. BRENNER
Attesting Officer                  Commissioner of Patents